Nov. 12, 1935.  A. F. IHDE  2,021,101
RADIATOR CORE AND SHELL ASSEMBLY
Filed Feb. 5, 1935
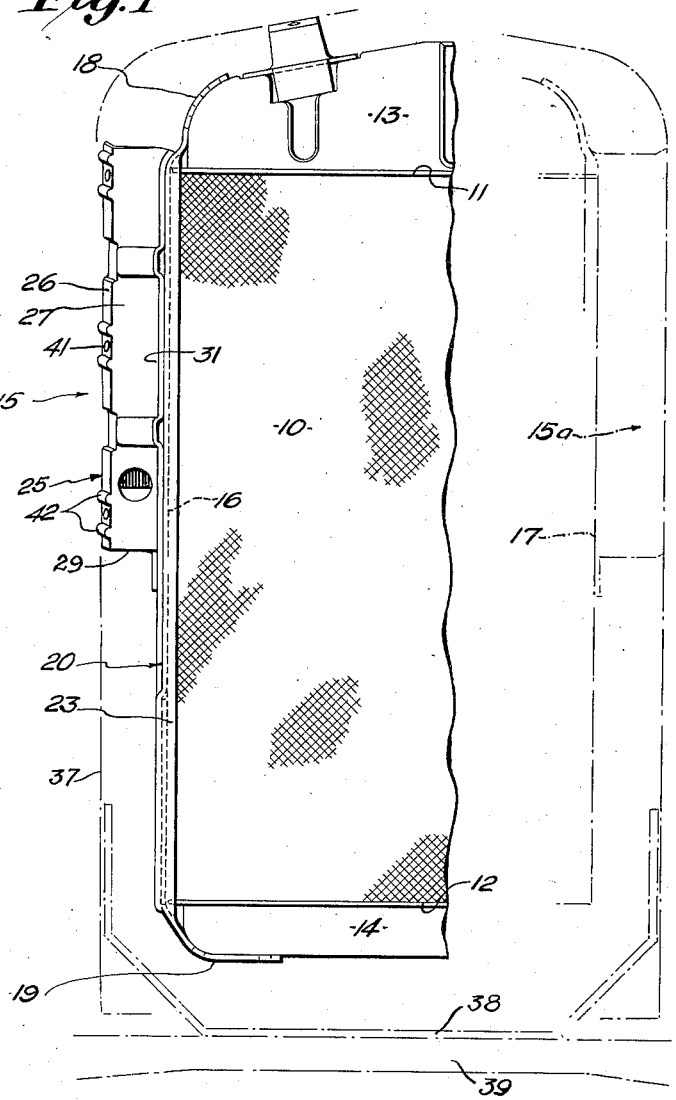
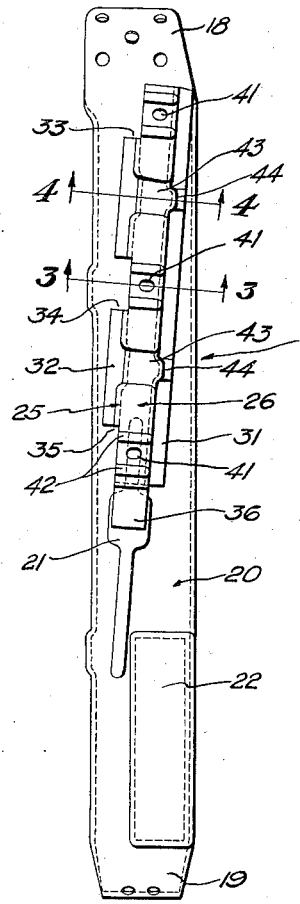
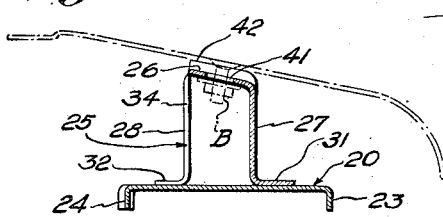
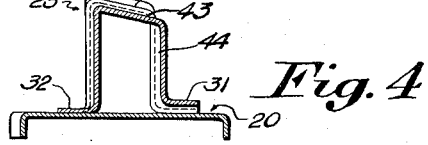
Inventor
*August F. Ihde*
By *Albert R Henry*
Attorney Patented Nov. 12, 1935

2,021,101

UNITED STATES PATENT OFFICE 2,021,101

RADIATOR CORE AND SHELL ASSEMBLY

August F. Ihde, Buffalo, N. Y., assignor to Fedders Manufacturing Company, Inc., Buffalo, N. Y.

Application February 5, 1935, Serial No. 5,085

4 Claims. (Cl. 180—68)

This invention relates to an improved side wall structure for an automobile radiator.

The recent trend in automotive engineering toward "softer" or more flexible front end spring suspensions, plus the allocation of greater loads thereon, has subjected the radiator structure to more violent reaction than heretofore obtained, and this condition has been particularly aggravated by the new positioning of the radiator forward of the front axle. As a result, the core unit of the radiator, being constructed of relatively fragile material, has been subjected to increased loads, resulting in premature failures.

It is therefore an object of the present invention to protect the core from the increased loads by providing an improved supporting structure therefor. This structure includes side wall members of columnar form, which, in cooperation with the tanks which they support, provide a rectangular enclosing structure for the core, in which deflection has been substantially eliminated. This structure is also devised to serve as a saddle or connecting means to a suitable support, which is herein shown as a radiator shell which, in turn, is secured to the frame of the automobile.

Other features of the invention are more specifically described and shown in the accompanying specification and drawing, wherein:

Fig. 1 is a front fragmentary view of an automobile radiator;

Fig. 2 is a side elevation of the side wall structure thereof;

Fig. 3 is a section on the line 3—3 of Fig. 2; and

Fig. 4 is a section on the line 4—4 of Fig. 2.

The radiator shown in Fig. 1 is fabricated of a rectilinear core 10 having top and bottom surfaces 11 and 12 to which are secured tanks 13 and 14, respectively. The tanks are connected by side wall members 15 and 15a, which are slightly spaced from the adjoining side surfaces 16 and 17, respectively, of the core.

The member 15 is formed of two parts, one of which is a strap 20 having bent extremities 18 and 19 which are soldered to the tanks, and it contains raised pads 21 and 22 which provide integral reinforcing means. For similar reasons, reinforcing flanges 23 and 24 are formed on the edges of the strap.

A saddle 25 provides the remaining part of the wall member 15, and it is formed of sheet metal to provide an elongated box shaped girder having a top wall 26, depending side walls 27 and 28, and an end wall 29. The front side wall 27 is formed with a flange 31, while the side wall 28 terminates in a flange 32 which contains slots 33, 34 and 35. The end wall 29 likewise terminates in a flange 36.

The saddle 25 is rigidly secured to the strap 20 by welding the flanges 31, 32 and 36 thereto, the latter flange being disposed on the pad 21. The component parts of the side wall member 15, thus integrated, cooperate to form a box column for supporting the tanks 13 and 14. The remaining side wall member 15a is of identical construction, differing only in that it is inverted or of the opposite hand.

Aside from their reinforcing properties, the members 15 and 15a provide a mounting means for the shell 37 of the radiator, which is shown in outline in Fig. 1. The shell may be of any form, but in the present invention it most advantageously is utilized to serve as a means for connecting the radiator to the frame of the automobile. It consists of an annular stamping enclosing the sides of the tanks and wall members, and it is provided with a horizontal strap or stud bar 38 which is secured to a cross member 39 of the automobile frame.

The side wall member 15 is provided with holes 41 in its top or outer wall 26, which receive suitable bolts "B" (Fig. 3) for attachment with the adjacent side wall of the shell 37. The radiator is thus rigidly secured on opposite sides to the side walls of the shell. The holes 41 are located transversely of the slots 33, 34 and 35 in the rear side wall 28, which slots thus serve to provide access for the application of nuts on the bolts B. These portions of the saddle 25 are strengthened transversely by straddling pairs of raised ridges 42 on the top wall 26. Between the holes, the walls 27, 26 and 28 contain a continuous transverse depression 43, merging into a raised pad 44, which likewise serves to lend transverse strength to the member.

It will be observed that the tanks and the water which they contain are subjected to violent vertical movements in the operation of the automobile. The resulting stresses are taken up directly in this invention by the side wall members, which, due to their columnar formation, will receive such loads without deflection, and, as a result, the enclosed core is fully protected from damaging strains.

The precise design of the radiator, herein shown, may obviously be varied in many respects without departing from the principle of the supporting structure, as set forth in the following claims.

I claim:

1. In a radiator, a rectilinear core, tanks secured to opposite ends of the core, side wall members extending along opposite sides of the core and having their extremities secured to the tanks, each member including a columnar formation having a hollow box cross section, and a shell enclosing the periphery of the tanks and wall members and secured to the outer portion of the columnar formation of the side wall members.

2. In a radiator, a rectilinear core, tanks secured to opposite ends of the core, side wall members extending along opposite sides of the core and each comprising a strap having terminal portions secured to the tanks, and an elongated member formed of sheet metal into a rectilinear cross sectional form, said elongated member having a flanged open side secured longitudinally to the strap to form a hollow box column therewith, and a shell enclosing the periphery of the tanks and wall members and secured to the outer walls of the elongated members.

3. In a radiator, a rectilinear core, tanks secured to opposite ends of the core, side wall members extending along opposite sides of the core and each comprising a strap having terminal portions secured to the tanks, and an elongated member formed of sheet metal into a rectilinear cross sectional form having a top wall, spaced side walls having flanged extremities and an open bottom, said elongated members being disposed on the strap and having their flanged extremities secured thereto to form a hollow box column therewith, and a shell enclosing the periphery of the tanks and wall members, said top walls of the members being formed with holes for receiving securing means for said shell, and one of said side walls of the elongated member having slots herein whereby access to the holes of the top wall is obtained.

4. In a radiator, a rectilinear core, tanks secured to opposite ends of the core, side wall members extending along opposite sides of the core and each comprising a strap having terminal portions secured to the tanks, and an elongated member formed of sheet metal into a rectilinear cross sectional form, said rectilinear member having a flanged open side secured longitudinally to the strap to form a hollow box column therewith, laterally extending ridges formed on the elongated member to reinforce the same, and a shell enclosing the periphery of the tanks and wall members and secured to the outer walls of the elongated members.

AUGUST F. IHDE.